(12) United States Patent
Cantwell et al.

(10) Patent No.: US 8,985,058 B2
(45) Date of Patent: *Mar. 24, 2015

(54) COLLAPSIBLE WIRE CRATE AND METHOD OF ASSEMBLY

(75) Inventors: Brad Cantwell, Muncie, IN (US);
Michael E. Greene, Muncie, IN (US);
Terrance L. Jones, Muncie, IN (US);
Robert Bemis, Yucaipa, CA (US)

(73) Assignee: Mid-West Metal Products Co., Inc., Muncie, IN (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/014,402

(22) Filed: Jan. 26, 2011

(65) Prior Publication Data

US 2012/0186529 A1    Jul. 26, 2012

(51) Int. Cl.
*A01K 1/03* (2006.01)
*A01K 1/02* (2006.01)

(52) U.S. Cl.
CPC ........... *A01K 1/034* (2013.01); *Y10T 29/49826* (2013.01); *Y10T 29/49947* (2013.01); *A01K 1/0245* (2013.01); *A01K 1/03* (2013.01)
USPC ............................ 119/474; 119/481; 119/501

(58) Field of Classification Search
CPC ..... E06B 9/17015; E06B 9/08; E06B 11/025; A47F 3/043; A01K 1/032; A01K 1/02; A01K 1/0236; A01K 31/00; A01K 31/005; A01K 31/06; A01K 31/07; A01K 31/08; A01K 31/10; A01K 1/0245; A01K 1/0272; A01K 1/0281; A01K 1/034; A01K 1/033; A01K 1/03; A01K 1/031; A01M 23/16; A01M 23/18; A01M 23/20; A01M 23/22

USPC ................. 119/481, 452, 474; 49/57, 323, 58
See application file for complete search history.

(56) References Cited

U.S. PATENT DOCUMENTS

| 2,222,008 | A |   | 11/1940 | White |         |
|-----------|---|---|---------|-------|---------|
| 3,791,347 | A | * | 2/1974  | Lovell | 119/497 |
| 3,812,999 | A | * | 5/1974  | Joseph | 220/494 |
| 3,896,766 | A | * | 7/1975  | Martin | 119/474 |
| 4,023,698 | A | * | 5/1977  | Joseph | 220/7 |

(Continued)

FOREIGN PATENT DOCUMENTS

FR    2876060    4/2006

OTHER PUBLICATIONS

Pet Gear Inc.; "Travel Lite Steel Crates"; www.petgearinc.com/product_info.asp?id=189; Pub. 2011 ("Pet Gear Inc." publication); pp. 1-2, USA.

(Continued)

*Primary Examiner* — Monica Williams
*Assistant Examiner* — Joshua Huson
(74) *Attorney, Agent, or Firm* — Taft Stettinius & Hollister, LLP; Stephen F. Rost

(57) ABSTRACT

The present invention provides a wire crate for housing an animal. The wire crate includes a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

24 Claims, 8 Drawing Sheets

(56) References Cited

U.S. PATENT DOCUMENTS

| | | | |
|---|---|---|---|
| 4,763,606 A * | 8/1988 | Ondrasik, II | 119/474 |
| 5,233,939 A * | 8/1993 | Randolph | 119/473 |
| 5,373,810 A * | 12/1994 | Martin | 119/459 |
| 5,626,098 A * | 5/1997 | Askins et al. | 119/474 |
| 5,845,432 A * | 12/1998 | Tully et al. | 43/61 |
| 6,092,488 A * | 7/2000 | Allawas | 119/497 |
| 6,192,834 B1 * | 2/2001 | Kolozsvari | 119/498 |
| 6,681,720 B1 * | 1/2004 | Skurdalsvold et al. | 119/474 |
| 8,408,416 B2 * | 4/2013 | Cheng-Lung et al. | 220/495 |
| 2004/0134444 A1 * | 7/2004 | Shiever et al. | 119/496 |
| 2005/0034679 A1 * | 2/2005 | Link | 119/474 |
| 2007/0000447 A1 * | 1/2007 | Jakubowski et al. | 119/453 |
| 2008/0245313 A1 * | 10/2008 | Jakubowski et al. | 119/497 |
| 2010/0282179 A1 * | 11/2010 | Ho | 119/455 |

OTHER PUBLICATIONS

European Search Report for European Patent Application 12250009.3, mailed Aug. 1, 2013; 9 pages.

* cited by examiner

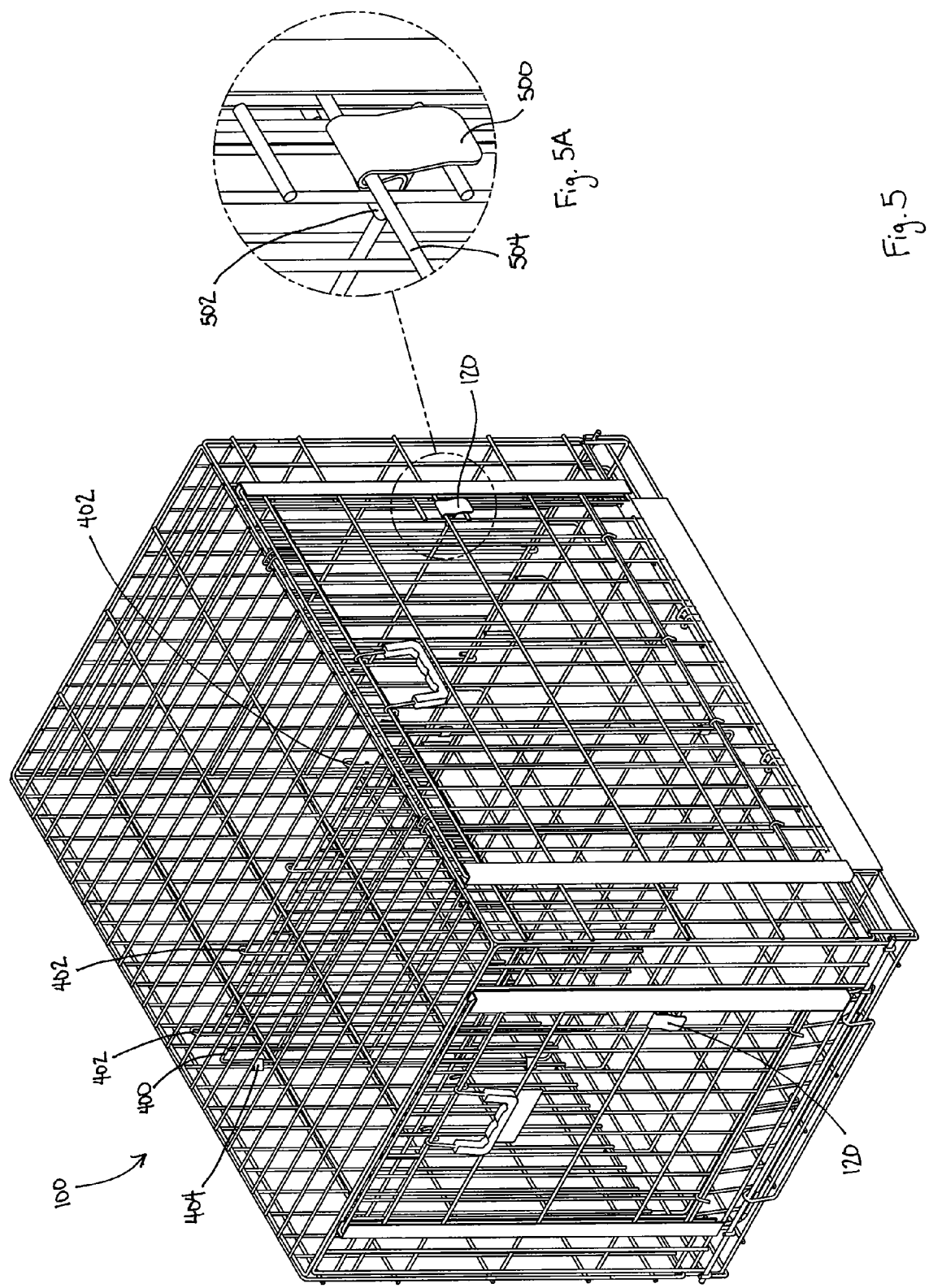

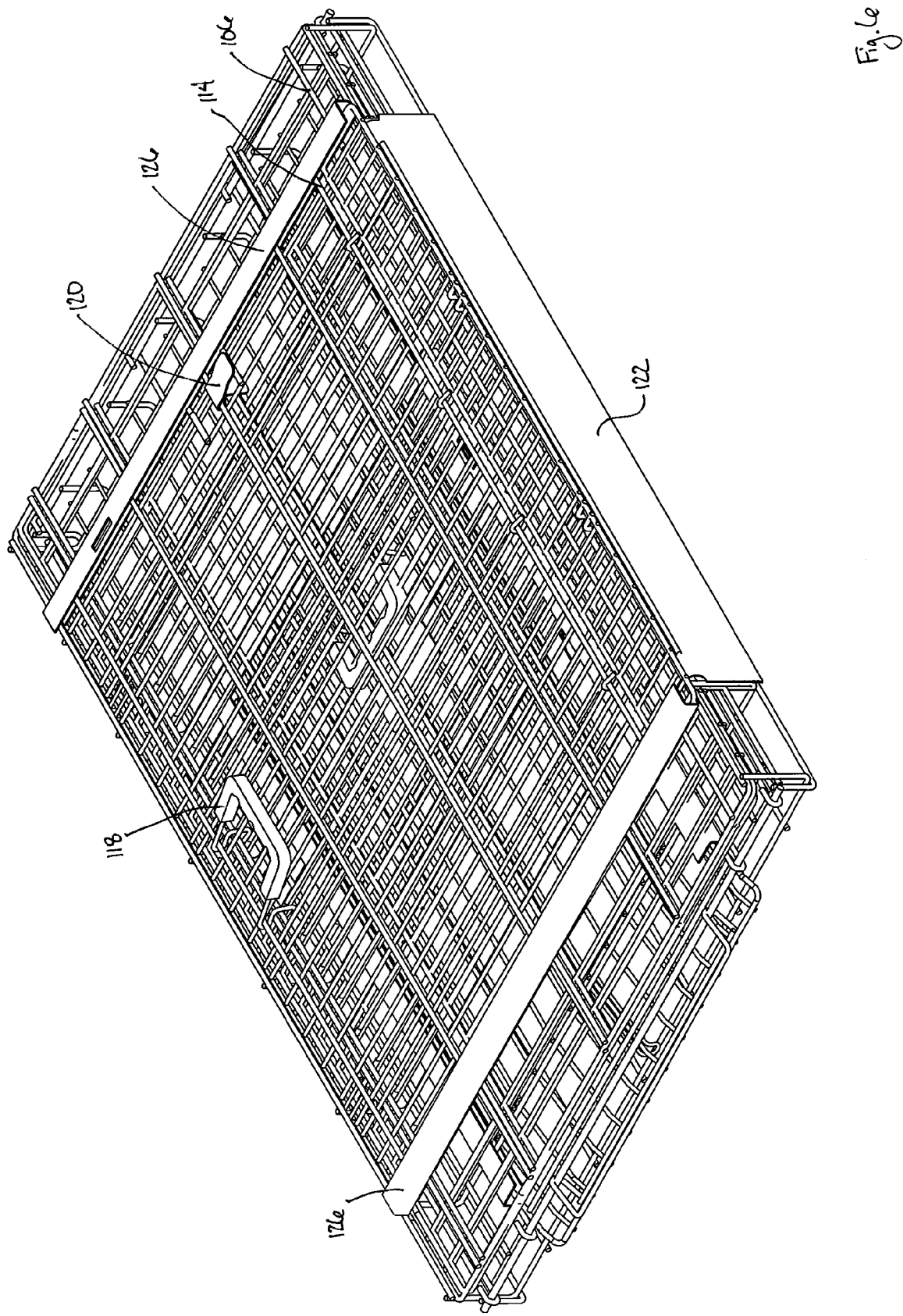

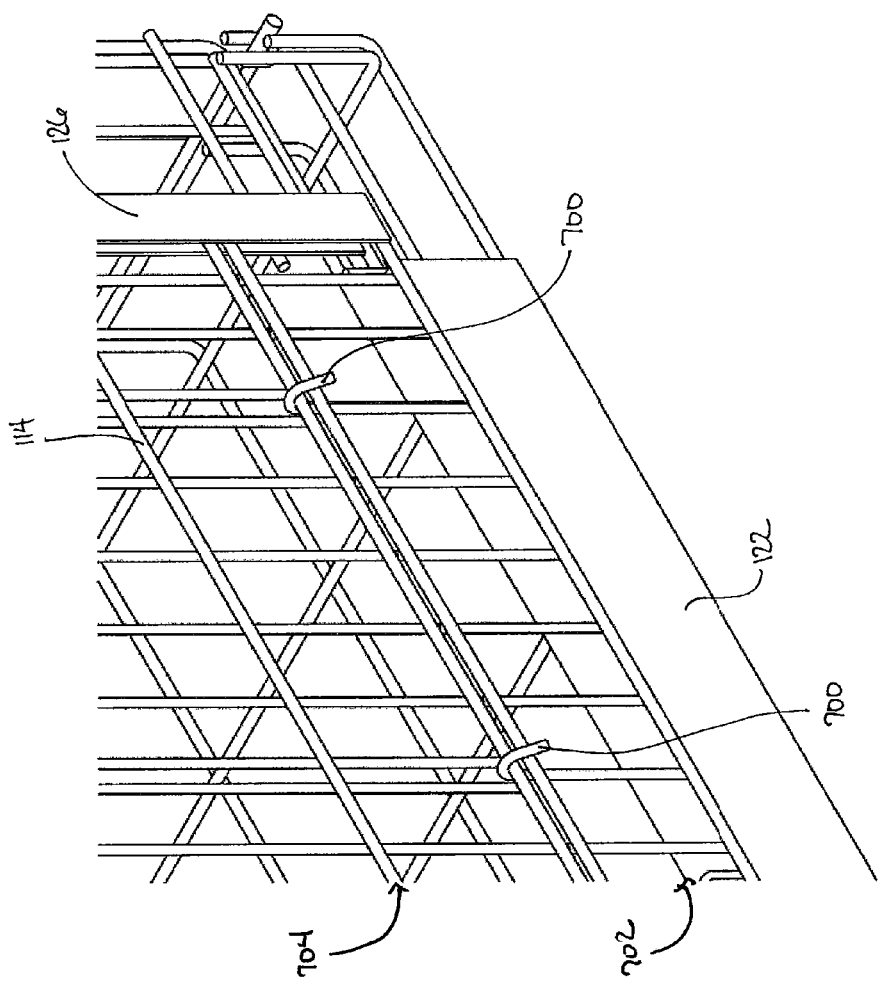

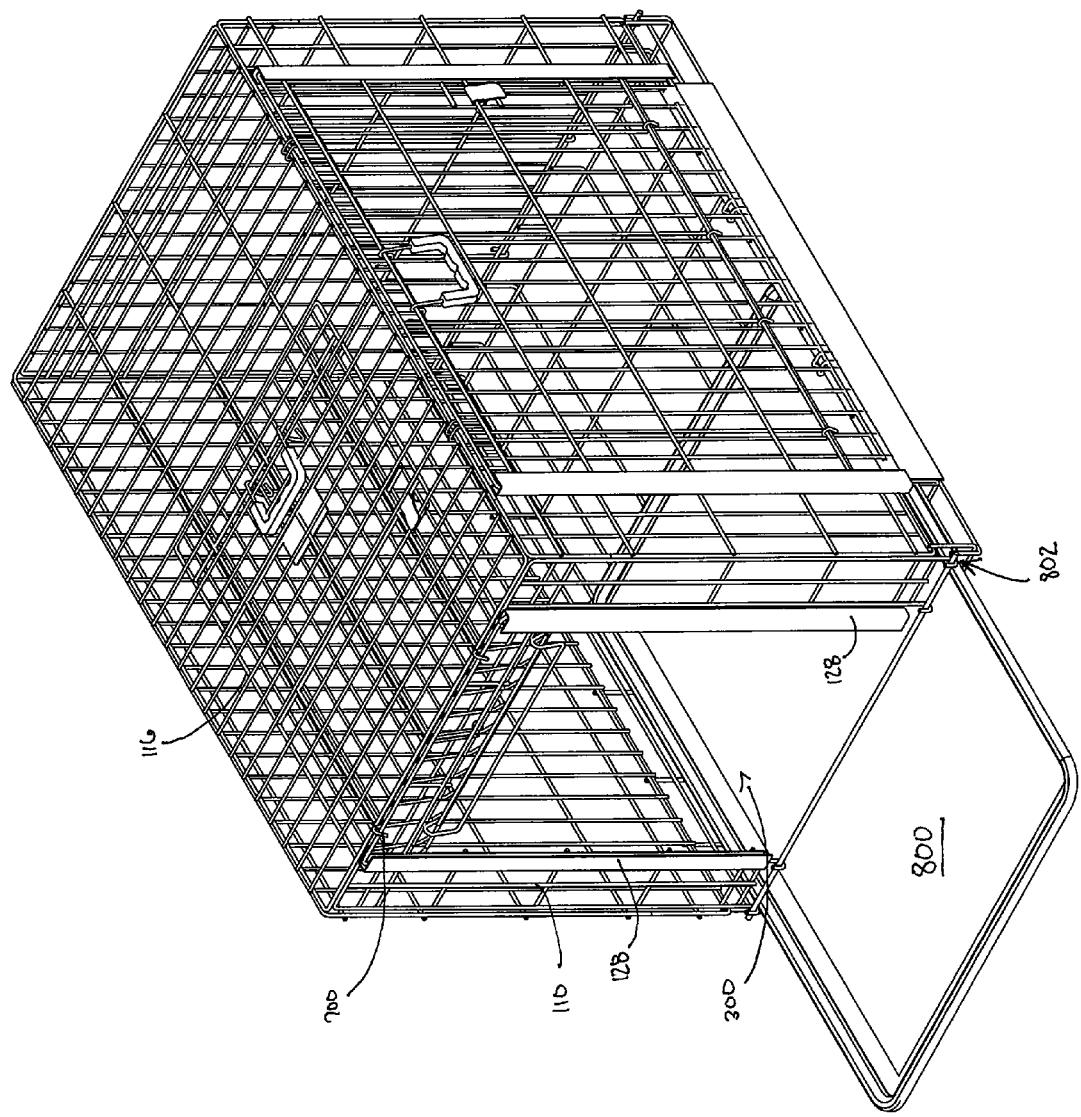

COLLAPSIBLE WIRE CRATE AND METHOD OF ASSEMBLY

FIELD OF THE INVENTION

The present invention relates to an apparatus for containing animals, and in particular to a collapsible wire crate for containing an animal.

BACKGROUND

The use of animal cages is well known in the prior art. Many conventional cages have been developed over the years for housing animals of different sizes, and through the development of these cages flexibility and portability have become points of emphasis. Some conventional cages, for example, have been designed to collapse to a compact position for portability. Others have been designed of light weight and from durable materials. Conventional cages have been designed for ease of transporting an animal.

Most conventional cages include at least one door for providing access to the interior of the cage. An animal can enter or exit the cage through the opening when the door is opened, and the animal can be safely contained in the cage when the door is closed. Many conventional cages include a door that is attached to the cage via a hinge. This allows the door to be swung open and closed. A spring activated latch or the like have been incorporated into the design of the door to allow a user to open or lock the door.

Many of these conventional designs have limitations, however. For instance, the door that is hingedly attached to the cage can be swung open or closed too quickly and scratch or damage another object such as a wall or furniture. In addition, due to the hinged connection, the door cannot be partially opened, i.e., the door is either open or closed.

Other conventional cages have a limited volume. For example, a large conventional cage is ideally suited for a larger animal, whereas a smaller cage is ideally suited for a smaller animal. However, many conventional cages with a larger capacity may not be suitable for a smaller animal. Further, it is not possible to change or reduce the size of a larger cage to meet the needs of a smaller animal. In some instances, it may be desirable to use a single cage for housing two or more animals, and many conventional cages are not designed to separate the animals from one another.

Therefore, a need exists for an improved animal crate that can be collapsible, portable, and overcomes some of the above-mentioned limitations in the prior art.

SUMMARY OF THE INVENTION

In one exemplary embodiment of the present invention, a wire crate is provided for housing an animal. The crate can include a top panel, a bottom panel, a front panel, a back panel, and a pair of side panels oppositely disposed from one another. A front opening can be defined in the front panel. The front opening is configured to provide access to the interior of the crate. The crate can also include a pair of tracks coupled to each side of the front opening such that a door can be slidably coupled to the pair of tracks. The door can slide along the pair of tracks between an open position and a closed position. The door can include a latch for assisting with opening and closing the door.

In one aspect of this embodiment, the crate can include a side opening defined in one of the pair of side panels. The side opening is configured to provide access to the interior of the crate. In this aspect, the crate can also include a second pair of tracks coupled to each side of the side opening. A second door can be slidably coupled to the second pair of tracks such that the second door slides along the second pair of tracks between an open position and a closed position. In addition, the second door can be disposed substantially parallel to the pair of side panels in the closed position and substantially perpendicular to the pair of side panels in the open position. In another aspect, the front door is disposed substantially parallel to the front panel and back panel in the closed position and substantially perpendicular to the front panel and back panel in the open position.

In another embodiment, a collapsible wire crate includes a front panel, a back panel, a top panel, a bottom panel, a first side panel, and a second side panel. A front opening is defined in the front panel and a side opening is defined in the first side. The front opening and side opening can be configured to provide access to the interior of the crate. A front door can selectively cover the front opening such that the front door is slidably coupled to the front panel. In addition, a side door can selectively cover the side opening such that the side door slidably couples to the first side panel. The front door is disposed substantially parallel to the front panel in a closed position and disposed substantially parallel to the top panel in an open position. Also, the side door is disposed substantially parallel to the first side panel in the closed position and disposed substantially parallel to the top panel in the open position.

In one form of this embodiment, a reinforcement layer is disposed along a portion of one of the front panel, back panel, first side panel, or second side panel. In another form thereof, a divider panel is provided for at least partially dividing the interior of the wire crate into a first portion and a second portion. The divider panel is coupled to one of the top panel, bottom panel, first side panel, or second side panel. The crate can also include a handle coupled to the front door or side door. In addition, the crate can include a latch for opening and closing the front door or side door. In one embodiment, the latch is pivotally coupled to the front door or side door. In a different embodiment, the crate can include a first pair of tracks coupled to the front panel and a second pair of tracks coupled to the first side panel, the front door sliding along the first pair of tracks between the open position and closed position and the side door sliding along the second pair of tracks between the open position and closed position.

In another exemplary embodiment, a method is provided for assembling a wire crate from its collapsed position. The crate can include a front panel, a back panel, a top panel, a bottom panel, a first side panel, and a second side panel, the front panel defining a front opening and the first side panel defining a side opening, the crate further including a front door slidably coupled to the front panel and a side door slidably coupled to the first side panel. The method can include pivoting the front panel and top panel away from the collapsed bottom panel, first side panel, second side panel, and bottom panel. The top panel can be pulled away from the front panel to form the top, front, and back portions of the crate. The first side panel can be pivoted from its collapsed position to its upright position such that the first side panel is substantially perpendicular to the top and bottom panels in the upright position. The first side panel can be secured to the top panel.

The method can further include pivoting the second side panel from its collapsed position to its upright position such that the second side panel is substantially perpendicular to the top and bottom panels in its upright position. The second side panel can be secured to the top panel.

In one form of this embodiment, the securing the first side panel to the top panel can include pulling the top edge of the first side panel away from the top panel and pushing the top panel toward the bottom panel. A hook disposed along the top edge of the first side panel can be coupled to the top panel. In a different form of this embodiment, the securing the second side panel can include pulling the top edge of the second side panel away from the top panel and pushing the top panel toward the bottom panel. A hook disposed along the top edge of the second side panel can be coupled to the top panel.

In one aspect of the embodiment, the method can include lifting the side door from its closed position and sliding the side door along tracks coupled to the first side panel. The side door can be pivoted toward the top panel when the bottom edge of the side door clears the side opening and placed in contact with the top panel. In another aspect, the method can include sliding a pan through a bottom opening defined in the first side panel.

In a different aspect, the method can include pivoting the side door away from the top panel and sliding the side door along the tracks so that the side door at least partially covers the side opening. The safety latch can be lifted to enable the side door to slide to its closed position. In addition, the method can include inserting a divider panel into the interior of the crate and coupling a hook at the top of the divider panel to the top panel of the crate. A clip can be coupled to the divider panel and first and second side panels.

An advantage associated with the various embodiments of the present invention is the front door and side door of the crate can be opened in a garage door-like manner. In other words, either or both doors can be slid and pivoted to rest in contact with the top panel, thereby creating easy access to the interior of the crate. In most conventional crates, the door is hingedly attached along one of its edges and swings open. The door can still be in the way of cleaning the interior of the crate, for example, and often is a hassle when trying to access the interior of the crate. In addition, care must be used when opening and closing the hingedly attached door so that other objects, e.g., walls, furniture, etc., are not scratched or damaged by the swinging door. Embodiments of the present invention avoid this inconvenience because the doors can be placed on top of the top panel and do not swing back and forth when opening and closing.

Another advantage associated with the various embodiments is the convenience of being able to separate two or more animals from one another by using a divider panel. It can also be advantageous to reduce the amount of space a younger animal may have inside the crate, and it can be easily accomplished by installing the divider panel. The divider panel can be easily installed and removed, and therefore allows for a larger crate to be used for housing one or more animals at the same time.

The manner in which the front door and side door close is also advantageous over conventional animal crates. A latch provided on both doors includes a catch or stopper portion that contacts wires when lowering the door to its closed position. The latch prevents the door from quickly shutting and possibly pinching or injuring an animal or the user. The latch is maneuvered to allow the door to completely shut. In addition, if the user wants to leave the door partially opened, the latch can be used to achieve a desired opening.

The crate can also be easily collapsed to a compact position to enable safe and easy travel. Likewise, the crate can also be easily assembled from the collapsed position. Other advantages will become known to one skilled in the art based on the drawings and described embodiments provided below.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 5 is a perspective view of the wire crate of FIG. 1;

FIG. 5A is an enhanced perspective view of a door latch;

FIG. 6 is a perspective view of a wire crate in a collapsed position;

FIG. 7 is a partial perspective view of a front door of a wire crate; and

FIG. 8 is a perspective view of a bottom pan partially removed from the interior of a wire crate.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a collapsible wire crate. The wire crate can be used for multiple purposes, one of which is to contain animals. The crate can be made of any size for accommodating an object of any size. In addition; the crate can be made of different materials including aluminium, plastic, and steel.

Figure 1:
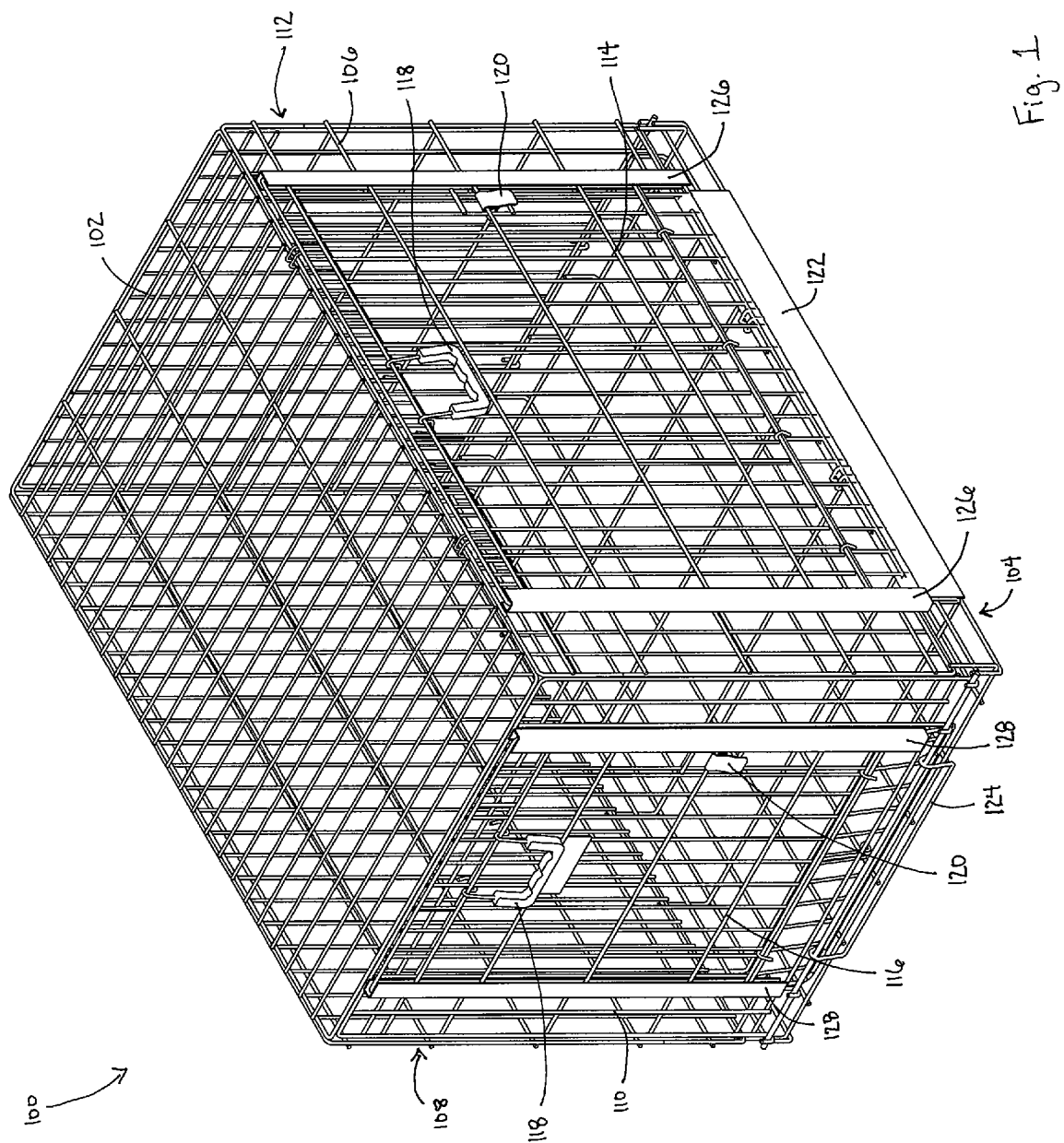
FIG. 1 is a perspective view of a wire crate.

Referring to FIG. 1, an exemplary embodiment of a crate 100 is shown. The crate 100 is formed of substantially horizontal and vertical wires to define an interior portion. The crate 100 can include a top panel 102, a bottom panel 104, a front panel 106, and a back panel 108. The crate 100 can further include a first side panel 110 and a second side panel 112, where the first side panel 110 is oppositely disposed from the second side panel 112. The dimensions of each panel can vary to accommodate the size of any animal, for example.

The front panel 106, back panel 108, top panel 102, and bottom panel 104 can form a continuous structure. In other words, these panels can be fixedly attached to one another. Alternatively, each panel can be removably coupled to one another.

As shown, each of the top panel 102, bottom panel 104, front panel 106, back panel 108, first side panel 110, and second side panel 112 can be formed with substantially horizontal and vertical wires. The spacing between each wire can vary. If a smaller animal is being contained in the crate 100, the spacing may be desirably smaller than if a larger animal is being contained.

The front panel 106 of the crate 100 can include a front door 114. The front door 114 can also be made of substantially horizontal and vertical wires as shown in FIG. 1. Further, the front door 114 can be moved between an open position and closed position. In the open position, a front opening 200 (FIG. 2) defined in the front panel 106 provides access to the interior of the crate 100.

Figure 2:
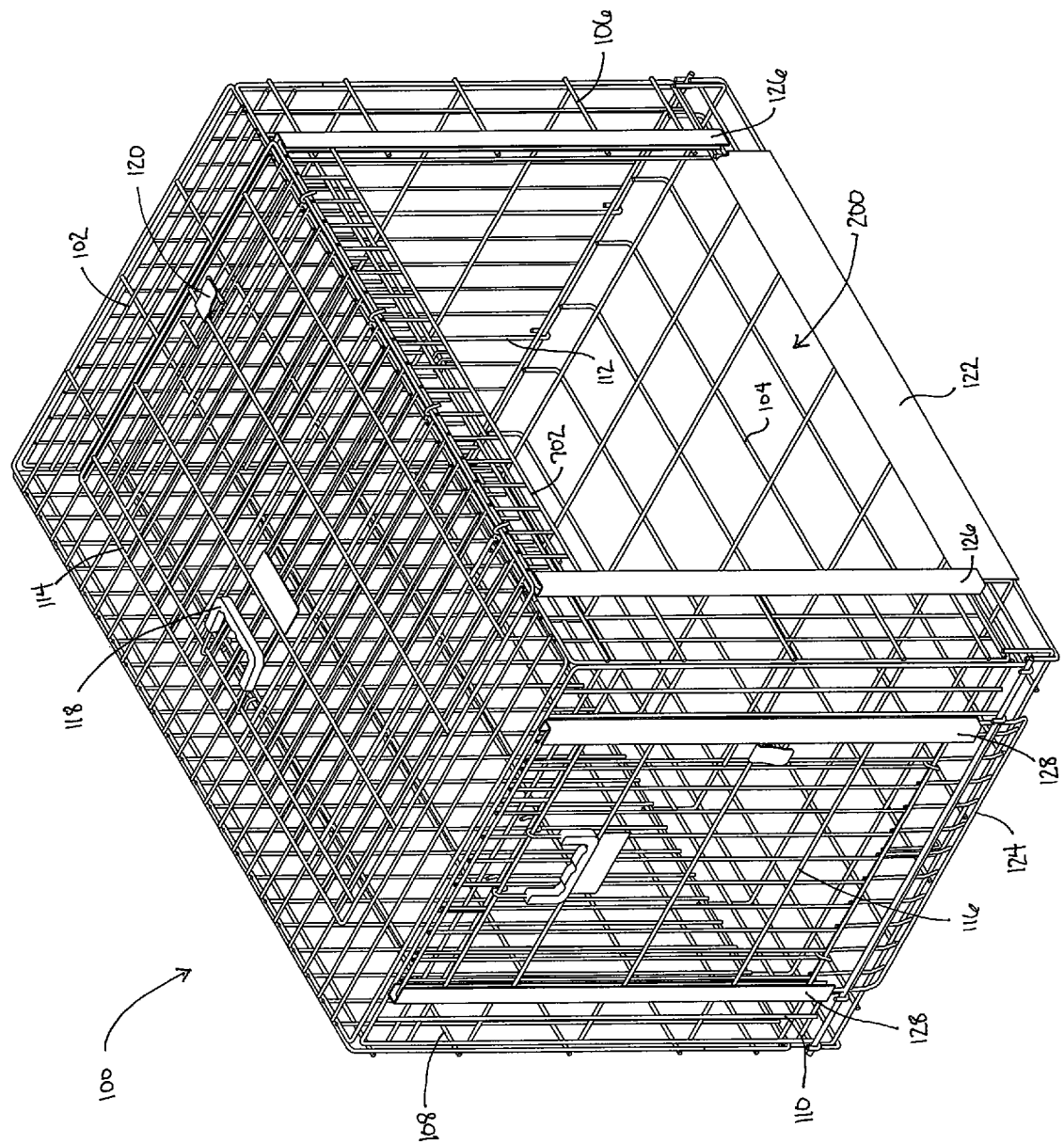
FIG. 2 is a perspective view of a wire crate having a front door in its open position.

As shown in FIGS. 1 and 2, the front door 114 can move between the closed position (FIG. 1) and the open position (FIG. 2) by sliding along a pair of tracks 126. In the illustrated embodiments, the edges of the door 114 that slides along the pair of tracks 126 do not include rollers, but in other embodiments rollers may be included to assist with opening and closing the door 114. As shown, the front door 114 includes a handle 118 and a latch 120. The handle 118 can include an outer layer or grip made of rubber or plastic that is ergonomically-friendly. The crate 100 can be easily carried by lifting the handle.

Referring to FIGS. 2 and 7, the front door 114 includes a bottom portion 702 and a top portion 704. Both the bottom portion 702 and top portion 704 move as the front door 114 moves between the open and closed positions. However, when the front door 114 is moved from the closed position to the open position, the top portion 704 of the door can pivot and rest on the top panel 102 of the crate 100. Thus, the door 114 can open and close in a manner similar to that of a garage door. The bottom portion 702, however, does not pivot and instead remains disposed substantially parallel with the front panel 106 (see FIG. 2). As shown in detail in FIG. 7, the top portion 704 is pivotally coupled to the bottom portion 702 via a plurality of hooks 700. Other types of fasteners can be used to facilitate the pivotal movement of the top portion 704 of the door 114. In the illustrated embodiment, however, the hooks 700 can be crimped so that the top portion 704 pivots toward the top panel 102 when opening the front door 114. In some embodiments, the top portion 704 is only able to pivot toward the top panel (only when opening the door), whereas in other embodiments the top portion 704 may freely pivot toward or away from the top panel when opening the door.

The crate 100 can also include a side door 116 for providing access to the interior of the crate 100. The side door 116 can be provided on either the first side panel 110 or second side panel 112, or in some embodiments, both the first side panel 110 and second side panel 112 can include a side door 116. Similar to the front door 114, the side door 116 can also include a handle 118 and a latch 120.

Figure 3:
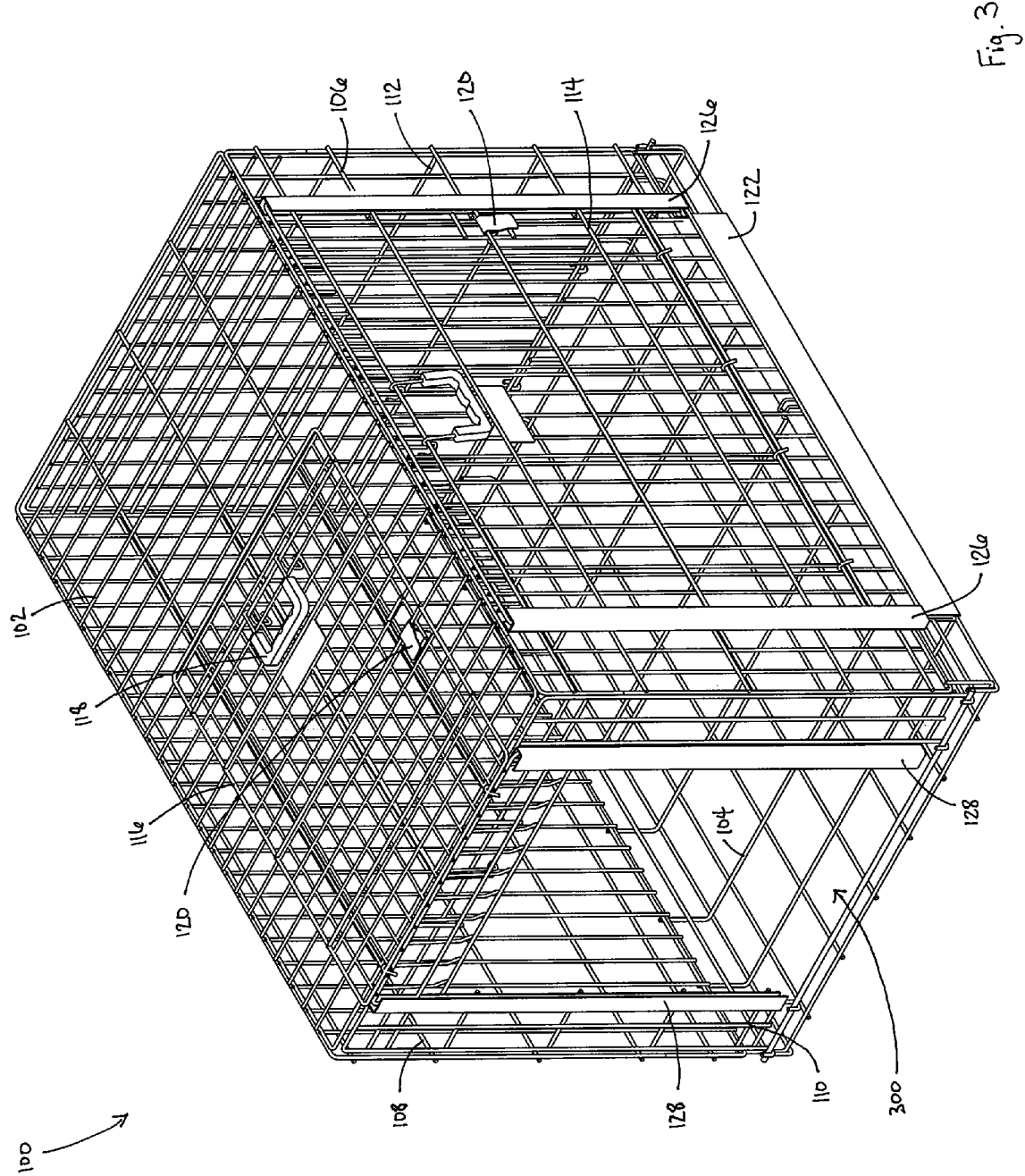
FIG. 3 is a perspective view of a wire crate having a side door in its open position.

Referring to FIG. 3, the side door 116 can be moved between an open position and closed position by sliding the door 116 along a pair of tracks 128. The pair of tracks 128 can be coupled to the first side panel 110 as shown. As the side door 116 slides from the closed position of FIG. 1 to the open position of FIG. 3, the door 116 travels along the pair of tracks 128 until it can rest on the top panel 102. As described above with respect to the front door 114, the side door 116 can also include a top portion pivotally coupled to a bottom portion. As such, the top portion can be pivoted to rest on the top panel 102 in a manner similar to a garage door opening. This, of course, allows the side door 116 to be opened in such a way that the door 116 is out of the way and does not interfere with accessing the interior of the crate. In addition, the side door 116 does not swing open and risk scratching, denting, or damaging nearby objects such as walls, furniture, etc. When the side door 116 is opened, a side opening 300 is defined in the first side panel 110 to allow for access to the interior of the crate.

The crate 100 can also be provided with a reinforcement or threshold layer 122. The reinforcement layer 122 can be made of sheet metal, for example. Alternatively, the reinforcement layer can be made of aluminium, plastic, resin, or other known material. The reinforcement layer 122 can be coupled to the coupled to or integrally formed with the bottom panel 104 to form a bowl-like configuration as shown in FIG. 1. In other embodiments, the reinforcement layer 122 can be coupled to the front panel 106 or back panel 108. In the illustrated embodiment of FIG. 1, a reinforcement layer could also be coupled to the second side panel 116 since there is no side door coupled thereto. In other words, it may be desirable to only have a crate 100 with a single door and provide reinforcement layers 122 coupled to those panels in which the door is not coupled thereto.

Figure 4:
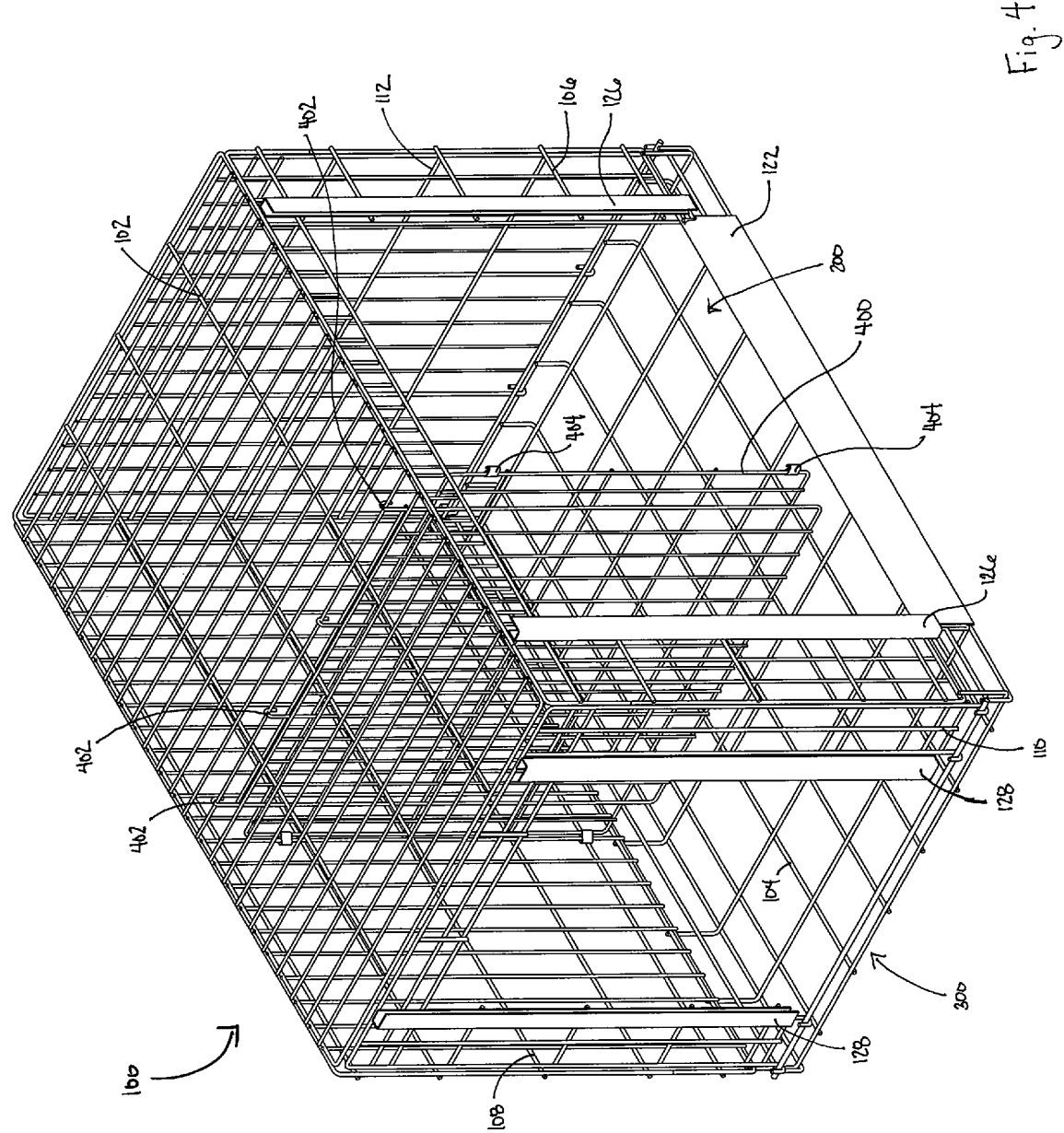
FIG. 4 is a perspective view of a wire crate having a divider panel assembled thereto.

Referring to FIG. 4, another embodiment of a crate 100 is illustrated with a divider panel 400 coupled thereto. One of the advantages of this embodiment is the ability to separate objects being contained in the crate 100. As shown, the divider panel 400 is formed of substantially horizontal and vertical wires similar to the rest of the crate 100, although this may not be required. For purposes of better understanding the divider panel 400 and how it couples to the crate 100, the front and side doors have been removed from the crate. As such, the divider panel 400 can include a plurality of hooks 402 disposed near a top edge of the panel 400. The plurality of hooks 402 can be coupled to wires of the top panel 102. Since the top panel 102 includes a plurality of substantially horizontal and vertical wires, the divider panel 400 can be coupled to the top panel 102 along any of these wires to adjust the desired space on each side of the divider panel 400. This enhances the flexibility of the crate 100 and its ability to contain one or more animals in separate areas therein.

The divider panel 400 can further be coupled to the crate 100 by using one or more clips 404. The clip 404 can couple a side edge of the divider panel 400 to the front panel 106 and/or back panel 108. Other fasteners or clamps can be used for coupling the divider panel 400 to the front or back panels. Alternatively, the divider panel may be coupled to the bottom panel 104.

As described above, the front door 114 and side door 116 can each include a latch 120. The latch 120 can be pivotally coupled to a wire 504 as shown in FIG. 5. The latch 120 can include a tab portion 500 and a stopper portion 502. For opening the front or side door, the handle 118 or latch 120 can be used for raising the door from the closed position. When closing the front or side door, however, the stopper portion 502 of the latch can prevent the door from closing too quickly. The stopper portion 502 extends toward the interior of the cage, and when closing the front or side door, the stopper portion 502 engages a substantially horizontal wire which prevents the door from sliding further downward along the corresponding tracks. The horizontal wire can be part of the top portion of the door or the front or side panel.

To completely close the door, the tab portion 500 of the latch 120 can be pivoted outward to release the stopper portion 502 from engaging the horizontal wire. One of the advantages of the latch 120 is the ability to prevent the door from slamming shut. Another advantage is being able to partially open and close the door by engaging the stopper portion 502 with the horizontal wire. In some embodiments, the door, front panel, or side panel can include a plurality of horizontal wires which engage with the stopper portion 502 of the latch 120 to allow the door to be partially opened at different intervals. For example, the front door 114 in FIG. 1 can be partially opened by engaging the stopper portion 502 of the latch 120 with one of several horizontal wires disposed along the length of the front door 114 or front panel 106.

Referring to FIG. 6, the crate 100 can be easily collapsed into a compact position. This can enable the crate 100 to be portable, for example, in a vehicle or airplane.

In addition, referring to FIG. 8, the crate 100 can include a bottom pan 800 that rests on the bottom panel 104. The pan 800 can have a similar length and width as the bottom panel 104, and the pan 800 makes cleaning the interior of the crate 100 easier. The pan 800 can have a raised periphery so that food, water, and other items do not easily spill out of the pan 800. As shown in FIG. 8, the pan 800 can be inserted into the crate 100 through an opening 802 defined in the first side panel 110. The side door 116 includes a pan stop 124 near the bottom side thereof. The pan stop 124 can include a single wire that extends downward toward the bottom panel 104 and can prevent the pan 800 from exiting through opening 802 when assembled.

In other embodiments, the pan 800 could be inserted through openings defined in the back panel 108, second side panel 112, or the front panel 106. The opening 802 is appropriately sized for the bottom pan 800 to be easily installed and removed as desired. Although not shown, a pad, bedding, cloth, or other object can be either placed on the pan 800 or inserted through the opening 802 instead of the pan 800.

In another exemplary embodiment, a method is provided for assembling a crate 100. The crate 100 can be in the collapsed position as shown in FIG. 6. As described above, the crate 100 can include a top panel 102, a bottom panel 104, a front panel 106, a back panel 108, and a first side panel 110 and second side panel 112 oppositely disposed from the first side panel 110. A front door 114 can be coupled to the front panel 106 and a side door 116 can be coupled to the first side panel 110. Both the front door 114 and side door 116 can include a handle 118 and latch 120 as described in the previous embodiment. In addition, when opening and closing, the front door 114 can slide along a pair of tracks 126 and the side door 116 can slide along a second pair of tracks 128.

In the collapsed position (see FIG. 6), the crate 100 can be easily stored in a box, carton, travelling bag, or other storage means. Once the crate 100 is removed therefrom, it can be assembled by first placing the bottom panel 104 on a flat surface. In this position, the front panel 106 is on top with the top panel 102 directly beneath the front panel 106. The back panel 108 can be positioned beneath the top panel 102, and the front and back panels can be hingedly or pivotally coupled to the top and bottom panels. In one embodiment, the front and back panels can be removably coupled to the top and bottom panels. In an alternative embodiment, the front and back panels can be fixedly coupled to the top and bottom panels. When coupled, the front, back, top and bottom panels can form a continuous main body.

Also in the collapsed position, the first side panel 110 and second side panel 112 can be folded inwardly on top of the bottom panel 104. In this configuration, the front panel 106, top panel 102, and back panel 108 are collapsed on top of the first side panel 110 and second side panel 112. The first side panel 110 and second side panel 112 can be hingedly or pivotally coupled to the bottom panel 104. These panels can be removably coupled or fixedly coupled to the bottom panel 104. As such, in another embodiment, it can be possible for the top panel 102, front panel 106, and back panel 108 to first collapse on top of the bottom panel 104 and then for the first side panel 110 and second side panel 112 to fold on top thereof, with either the first side panel 110 or second side panel 112 resting on top of the other.

To assemble the crate from the collapsed position, the crate may have to be unlatched to do so. To unlatch the crate, the tab portion 500 of the latch 120 on the front door 114 is lifted to disengage the stopper portion 502. Once unlatched, the handle 118 on the front door 114 can be lifted to pull the front panel 106 from the collapsed position. As the front panel 106 pivots away from its collapsed position, the top panel 102 follows and remains substantially parallel to the front panel 106.

The top panel 102 can then be lifted away from the front panel 106 to a position in which the top panel 102 is substantially parallel and directly above the bottom panel 104. In this position, the front panel 106 and back panel 108 are substantially upright and parallel to one another.

Once the top panel 102, front panel 106, and back panel 108 are arranged, the first side panel 110 and second side panel 112 can be assembled. In one exemplary embodiment, the first side panel 110 can be latched to the second side panel 112, and to assemble, the tab portion 500 of the latch 120 on the side door 116 can be lifted to unlatch the two panels. The first side panel 110 can then be raised to an upright position. The first side panel 110 can be coupled to the top panel 102 in a plurality of ways. One such way is by aligning hooks which extend outward from the first side panel 110 with an end wire on the top panel 102. Clips or other fasteners may also be used for coupling the first side panel 110 to the top panel 102 and/or the front panel 106 and back panel 108.

Similarly, the second side panel 112 can be lifted from its collapsed position to an upright position. In its upright position, the second side panel 112 can be coupled to the top panel 102 by aligning hooks near the top edge of the panel with an end wire of the top panel 102. Clips or other fasteners may be used to further couple the second side panel 112 to the top panel 102 and/or front panel 106 and back panel 108. The panels may be coupled in other ways known to the skilled artisan. For instance, in another embodiment, the top panel 102 can include hooks that engage the first side panel 110 and second panel 112.

Once the side panels are assembled, the basic structure of the crate 100 is assembled. A bottom pan 800 and divider panel 400 can also be assembled. As described above, the first or second side panels can define an opening 802 adjacent the bottom panel 104 such that the bottom pan 800 can be inserted therethrough. A blanket, pad, cloth, or other object may be placed on the pan for comfort and warmth to an animal being contained in the crate 100.

If more than one animal, for example, is being contained in the crate 100, a divider panel 400 can be installed for separating at least two animals. In some crates, the size may be such that more than one divider panel 400 is installed for separating a plurality of animals. In any event, once the basic structure of the crate 100 has been assembled, the front door 114 and/or side door 116 can be opened for assembling the divider panel 400. To do so, the latch 118 on the door(s) is disengaged by lifting the tab portion 500 and sliding the door along the pair of tracks. For example, the front door 114 is lifted along the first pair of tracks 126 and the side door 116 is lifted along the second pair of tracks 128. By lifting the tab portion 500 of the latch, the stopper portion 502 of the latch is disengaged and releases the door for movement.

As shown in FIG. 2, once the front door 114 is released from a latched position, the door 114 can slide along the first pair of tracks 126 and then be pivoted toward the back panel 108 and placed in contact with the top panel 102. In this embodiment, the front opening 200 is accessible for assembling the divider panel 400.

As shown in FIG. 3, if the side door 116 is released from its latched position, the side door 116 can slide along the second pair of tracks 128 and then be pivoted toward the second side panel 112 and placed in contact with the top panel 102 (or front door 114 if both doors are opened). It may also be possible to open the side door 116 and then open the front door 114 such that the side door 116 is placed on top of the top panel 102 and the front door 114 is placed on top of the side door 116. Once either door is opened, the divider panel 400 can be assembled.

In one aspect, the divider panel 400 can include hooks along its top edge. For assembly purposes, the hooks can be coupled to a wire of the top panel 102 that runs longitudinally from the front panel 106 to the back panel 108. Removable clips or other fasteners may be used to couple the divider panel 400 to the front door 114 and back panel 108 when the front door 114 is in its closed position.

In another aspect, the divider panel 400 can have an adjustable or fixed width such that the panel 400 can be coupled to the front panel 106, back panel 108, first side panel 110, and/or second side panel 112. The divider panel 400 can also be coupled to the top panel 102 by coupling hooks disposed near a top edge of the divider panel 400 to a wire that runs from the first side panel 110 to the second side panel 112. This allows for additional flexibility to the crate 100.

In a different aspect, the divider panel 400 can have hooks along its side edges such that the hooks couple to vertically-oriented wires of the front panel 106, back panel 108, first side panel 110, or second side panel 112. Removable clips or other fasteners can couple the top edge of the divider panel to the top panel 102. Other possible aspects for coupling the divider panel 400 to the top panel 102, bottom panel 104, front panel 106, back panel 108, first side panel 110, and second side panel 112 may be understood by one skilled in the art.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wire crate for housing an animal, comprising:
   a top panel, a bottom panel, a front panel, a back panel, and a pair of side panels oppositely disposed from one another and configured to define an interior of the crate, wherein the top panel defines a plane extending along the top panel at a location outside of the interior;
   a front opening defined in the front panel, the front opening configured to provide access to the interior of the crate;
   a pair of tracks coupled to each side of the front opening, wherein each of the tracks includes a channel and an open end disposed near the top panel; and
   a door slidably coupled to the pair of tracks, wherein the door slides along the pair of tracks between an open position and a closed position;
   further wherein, the door comprises an upper portion, having a first end and a second end, spaced from the first end, and a lower portion pivotally coupled to the second end, where in the closed position the upper portion and lower portion are retained within the tracks, and in the fully open position only the lower portion is retained within the tracks and the upper portion is subtended by the plane defined by the top panel, wherein pivotal movement of the upper portion with the lower portion is restricted by the pair of tracks during movement of the upper portion within the tracks along the front panel, and pivotal movement of the upper portion with respect to the lower portion is substantially unrestricted by the channels of each of the pair of tracks once the second end of the upper portion is located at a position past the open ends of each of the tracks.

2. The wire crate of claim 1, further comprising a latch pivotally coupled to the door, the latch including a stopper portion that extends toward the interior of the crate;
   wherein, the door is slidable to a partially open position when the stopper portion engages a wire on the front panel.

3. The wire crate of claim 1, further comprising a side opening defined in one of the pair of side panels, the side opening configured to provide access to the interior of the crate.

4. The wire crate of claim 3, further comprising a second pair of tracks coupled to each side of the side opening.

5. The wire crate of claim 4, further comprising a second door slidably coupled to the second pair of tracks, wherein the second door slides along the second pair of tracks between an open position and a closed position;
   further wherein, the second door comprises an upper portion and a lower portion pivotally coupled to one another, where in the closed position the upper portion and lower portion are retained within the second pair of tracks, and in the open position only the lower portion is retained within the tracks.

6. The wire crate of claim 5, wherein the upper portion and lower portion of the second door are disposed substantially parallel to the pair of side panels in the closed position and the upper portion of the second door is substantially perpendicular to the pair of side panels in the open position.

7. The wire crate of claim 1, wherein the upper portion and lower portion of the door is disposed substantially parallel to the front panel and back panel in the closed position, and the upper portion is substantially perpendicular to the front panel and back panel in the open position.

8. The wire crate of claim 1 wherein the upper portion rests on the top panel in the fully open position.

9. The wire crate of claim 8 wherein the upper portion of the door includes a handle located between the first end and the second end thereof and wherein the handle, the pair of tracks, and the front panel are configured for the handle to be continuously accessible for uninterrupted gripping during movement of the door from the open position to the closed position.

10. The wire crate of claim 9 wherein each of the pair of tracks provide an uninterrupted sliding surface configured to provide for continuous sliding movement of the upper portion and lower portion within the tracks from the closed position to the open position.

11. A collapsible wire crate, comprising:
   a front panel, a back panel, a top panel, a bottom panel, a first side panel, and a second side panel, each of the front panel, back panel, top panel, bottom panel, first side panel, and second side panel including a plurality of interconnecting horizontal and vertical wires;
   a front opening defined in the front panel and a side opening defined in the first side, the front opening and side opening configured to provide access to the interior of the crate;
   a first track assembly including a first track coupled to one side of the front opening and a second track coupled to an opposite side of the front opening, the first and second tracks having substantially U-shaped structures, where each substantially U-shaped structure defines a channel therein;
   a second track assembly including a first track coupled to one side of the side opening and a second track coupled to an opposite side of the side opening, the first and second tracks having substantially U-shaped structures, where each substantially U-shaped structure defines a channel therein;
a front door for selectively covering the front opening, the front door slidably coupled to the first track assembly such that the front door slides within the defined channels of the first track and second track; and
a side door for selectively covering the side opening, the side door slidably coupled to the second track assembly such that the side door slides within the defined channels of the first track and second track;
a latch for opening and closing the front door or side door, the latch having a first end forming a tab portion and a second end forming a stopper portion, the latch being pivotally coupled to a horizontal wire of the front door or side door at a location between the first end and second end, wherein the stopper portion is in contact with one of the plurality of horizontal wires of the front door or side door in a closed position;
wherein, the front door is disposed substantially parallel to the front panel in a closed position and disposed partially parallel to the top panel in an open position;
further wherein, the side door is disposed substantially parallel to the first side panel in the closed position and disposed partially parallel to the top panel in the open position, and
wherein the front door comprises a first portion and a second portion pivotally coupled to one another, where in the closed position the first portion and second portion are retained within the channels of the first track assembly, and in the fully open position only the second portion is retained within the channels of the first track assembly and the first portion rests on top of the top panel and the tracks provide an uninterrupted sliding surface configured to provide for continuous sliding movement of the first portion and second portion within the tracks from the closed position to the fully open position.

12. The collapsible wire crate of claim 11, further comprising a reinforcement layer disposed along a portion of one of the front panel, back panel, first side panel, or second side panel.

13. The collapsible wire crate of claim 11, further comprising a divider panel for at least partially dividing the interior of the wire crate into a first portion and a second portion, the divider panel coupling to one of the top panel, bottom panel, first side panel, or second side panel.

14. The collapsible wire crate of claim 11,
wherein the stopper portion extends toward the interior of the crate such that as the front door or side door is moved between a fully open position and the closed position, the stopper portion is pivoted about the horizontal wire of the front panel or side panel to avoid contacting any of the plurality of horizontal wires on the front or side panel.

15. The collapsible wire crate of claim 11, wherein the side door comprises a first portion and a second portion pivotally coupled to one another, where in the closed position the first portion and second portion are retained within the channels of the second track assembly, and in the fully open position only the second portion is retained within the channels of the second track assembly and the first portion rests on top of the top panel.

16. The collapsible wire crate of claim 11 wherein the substantially U-shaped structures each comprise a U-shaped cross-section defined substantially perpendicular to an axial length of the first track and the second track, the axial length of the first track and the second track configured to extend along the vertical wires.

17. the collapsible wire crate of claim 16 wherein the uninterrupted sliding surface is disposed at each of three sides of the U-shaped cross-section.

18. A wire crate for containing an animal, comprising:
a top, a bottom, a front, a back, a first side, and a second side, the first side and second side being oppositely disposed from one another, where the top, bottom, front, back, first side and second side include a plurality of interconnecting horizontal and vertical wires that define an interior therebetween;
a track assembly coupled to one of the front, back, first side or second side, the track assembly including a first track and a second track spaced from one another, wherein each of said tracks comprises a channel and an open end disposed near said top; and
a door having a first portion and a second portion pivotally coupled to one another, the door being movable along the first track and second track between a fully open position, a closed position, and a plurality of vertically-spaced positions therebetween to allow access to the interior through an opening defined between the first track and second track;
a handle operatively connected to the first portion, wherein the handle, the track assembly, and the front are configured for the handle to be continuously accessible for uninterrupted gripping during movement of the door from the fully open position to the closed position,
a latch pivotally coupled to the door, the latch including a stopper portion;
wherein, in the open position, the first portion and second portion of the door are substantially perpendicular to one another;
further wherein, the latch is pivotable between a first position and a second position, in the first position the stopper portion is pivoted towards the interior to engage at least one of the plurality of horizontal wires to thereby limit movement of the door in a vertical direction and maintain the door in one of the open position, the closed position, or one of the plurality of vertically spaced positions therebetween, and in the second position the stopper portion is pivoted away from the interior to allow the door to move between the fully open position and closed position.

19. The wire crate of claim 18, wherein, in the closed position, the first portion and second portion are retained within channels defined in the first track and second track, wherein the channels include an uninterrupted sliding surface configured to provide for continuous sliding movement of the first portion and second portion within the channels from the closed position to the fully open position.

20. The wire crate of claim 18, wherein, in the fully open position, the first portion is disposed on top of the crate.

21. The wire crate of claim 18, wherein as the door moves to the closed position the first portion and second portion pivot relative to one another from a substantially perpendicular disposition to a substantially planar disposition.

22. The wire crate of claim 18, wherein the first portion is larger than the second portion such that in the fully open position the larger first portion is positioned above the top of the crate and the smaller second portion remains disposed within the first track and second track to permit a quick manipulation of the door from the open position to the closed position.

23. The wire crate of claim 18, wherein as the door moves between the fully open and closed positions, the first portion is disposed out of contact with the first track and second track, whereas the second portion remains movably disposed within channels defined by the first track and second track.

24. The wire crate of claim 18, wherein the fully open position, the closed position, and each of the plurality of vertically-spaced positions therebetween is formed by an engagement of the stopper portion with a different one of the plurality of horizontal wires of the front, back, first side or second side.

\* \* \* \* \*